March 5, 1963 H. TROEGER 3,080,030
EMERGENCY DISCONNECT DEVICE
Filed July 21, 1959 2 Sheets-Sheet 1

INVENTOR.
HENRY TROEGER
BY
*Robert W. Ely*
ATTORNEY

March 5, 1963  H. TROEGER  3,080,030
EMERGENCY DISCONNECT DEVICE
Filed July 21, 1958  2 Sheets-Sheet 2

INVENTOR.
HENRY TROEGER
BY
Robert W. Ely
ATTORNEY

United States Patent Office 3,080,030
Patented Mar. 5, 1963

3,080,030
EMERGENCY DISCONNECT DEVICE
Henry Troeger, Cooperstown, N.Y., assignor to The Bendix Corporation, a corporation of Delaware
Filed July 21, 1958, Ser. No. 749,986
7 Claims. (Cl. 192—101)

This invention relates to high-speed torque transmission means and more particularly concerns an emergency disconnect coupling or device for connecting and uncoupling a powered drive shaft and a driven shaft in an aircraft.

An object of the present invention is to provide an improved emergency disconnect coupling device which is actuated by axial motion whereby application of the required force can be made smoothly at any speed. Another object is the provision of an emergency disconnect which is not subject to false disconnects resulting from torsional vibration such as sometimes occurs with rotatable actuating means. A further object is the provision of an emergency disconnect which is compact and fast-acting. An additional object is the provision of an axial-actuated disconnect device in which clashing of separated curvic teeth is prevented. A further object is the provision of an emergency disconnect which is readily re-engaged after a faulty accessory attached to the driven shaft has been repaired or replaced.

The realization of the above objects along with the features and advantages of the present invention will be apparent from the following detailed description and the accompanying drawing in which.

Figure 1:
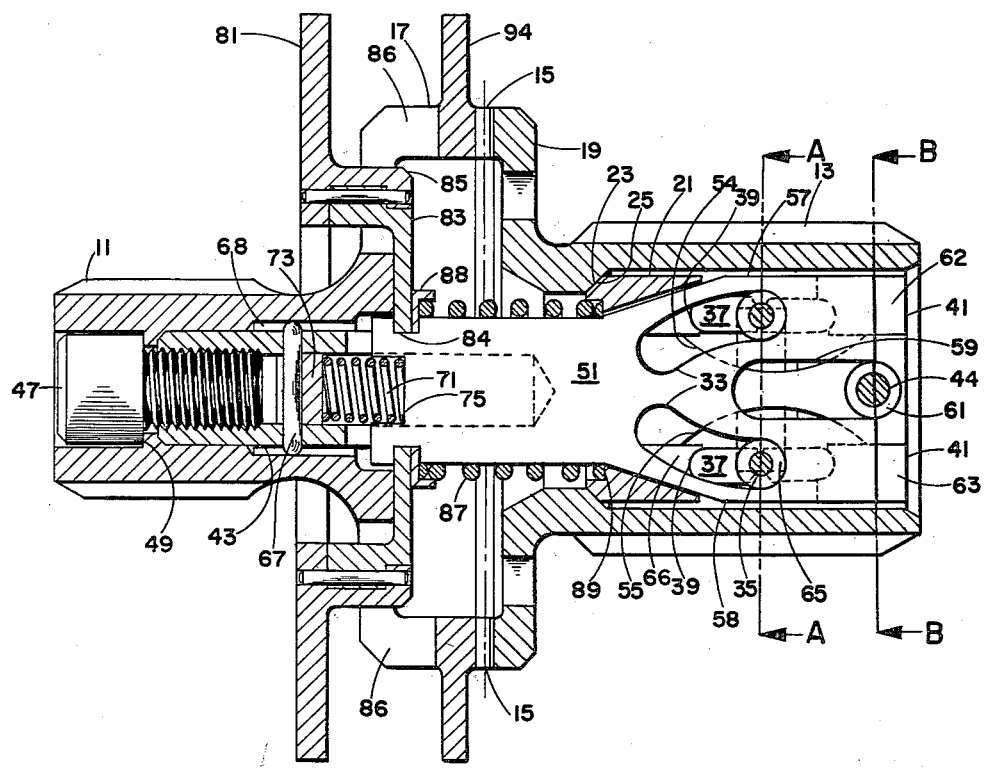
FIG. 1 is side cross-sectional view of a preferred embodiment of the invention in engaged position and shows an axially-movable cam plate for collapsing toggles.
Figure 2:
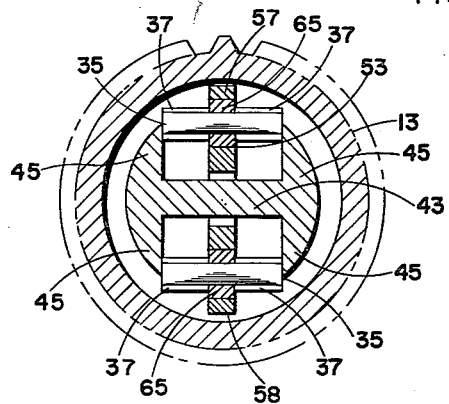
FIG. 2 is transverse cross-sectional view along the line A—A of FIG. 1 and shows lateral confinement of the toggles by projections from the axial support rod.
Figure 3:
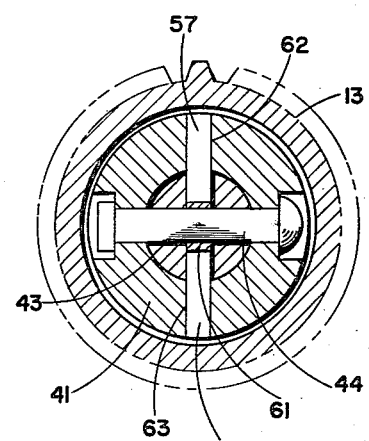
FIG. 3 is a transverse cross-sectional view along the line B—B of FIG. 1 and shows the ends of the cam plate guided by adjacent structure.

Referring to FIGS. 1–5 of the drawing, the left splined shaft 11 is coupled to the right splined shaft 13 by means of curvic teeth 15. Each hollow shaft has a radially-outwardly-extending flange 17 and 19 and the teeth 15 are formed in the facing peripheral edge parts or surfaces of the flanges 17 and 19. The mating curvic teeth having a thirty degree pressure angle at the sides and flat tops and bottoms are held in engagement by the wedging action of locking or wedging ring 21 against a radially-inwardly extending annular shoulder 23 on the interior of the right shaft. As so engaged, an aircraft engine connected to the drive or input shaft 13 can drive an accessory connected to the driven or output shaft 11. Ring 21 has an inclined surface 25 which mates with the surface of shoulder 23, both diverging radially-outwardly away from the axially inner ends of the shafts. Annular locking ring 21 is wedged tight in the cylindrical interior of shaft 13 by two toggle links which are held at dead center by the action of arcuate cam slots 33 on the toggle fulcrum pins 35 of the toggle links. Each of the aligned toggle links is comprised of two pairs of flat arms 37 and 38 which extend axially from the fulcrum pins 35 at each side of the cam plate 51 to transverse recesses 39 in the right face of the wedge ring 21 and oppositely to transverse recesses 40 in the left face of the stationary annular reaction collar 41. See FIGS. 1 and 4. The facing fulcrum ends of toggle arms 37 and 38 are constructed to permit radially-inwardly movement but very limited outward movement from center line. Toggle reaction is at collar 41 which is fixed by brazing on axially-extending support rod 43. The left end of stationary rod 43 is mounted in the interior of the left shaft 11 while its right end is mounted on bolt 44 which holds the two halves of collar 41 together (see FIG. 3). Screw 47 is threaded in the left end of the rod and abuts a shoulder 49 on shaft 11.

Axial cam plate 51 having radially-inwardly-curved cam slots 33 is slidably mounted or fitted in radial slot 53 in rod 43. See FIG. 5. Rod 43 has top and bottom recesses 54 and 55 for accommodating the inward movement of the toggle links. Rod 43 also has four radially-outwardly-extending top and bottom projections 45 at each side which provide means for restraining the fulcrum pins 35 and toggle arms 37 and 38 from moving laterally toward the inner surface of the shaft 13. See FIGS. 1 and 2. Cam plate 51 has two laterally-extending arms 57 and 58 and an axial guide slot 59 in the right end thereof. Cam slots 33 are in each cam arm and the ends of the arms, radially-outward of guide slot 59, ride on roller 61 mounted on collar bolt 44 and extend into radial-extending guide openings 62 and 63 provided by the collar 41 whereby means are provided for supporting and guiding the toggle end of the cam plate 51. Fulcrum pins 35 also have rollers 65 which contact the cam slots 33. Wedge ring 21 has axial grooves 66 for the axial-inner parts of the cam plate arms when the coupling is engaged whereby additional compactness results. Rod 43 is restrained from rotation by pin 67 which fits in axial grooves 68 in shaft 11. A spring 71 is positioned in the interior of rod 43 and extends to a circular plate 73 abutting pin 67 and to the axial recess 75 in the left end of the cam plate 51. Spring 71 exerts an axial force urging the cam plate to the right so that assembly is facilitated.

The actuator means for moving the cam plate 51 to the right is comprised of an annular actuating ring 81 to the left and exteriorly of flange 17, an annular connection ring 83 fitted into two recesses 84 in the radial-outer sides of the left end of the cam plate, and four equi-spaced connecting arms 85 extending axially through openings 86 in flange 17. See FIG. 1. A spring 87 encircles the cam plate and abuts a flanged washer 88 at the left and abuts at the right at the bottom of a radial inner ledge 89 in wedging ring 21. Spring 87 urges the cam plate 51 and actuator means (which can be referred to as cam means) to the left against shaft 11. Fixed collar 41, the centered toggles, and wedged locking ring 21 normally provide support structure at the right end of spring 87.

Figure 4:
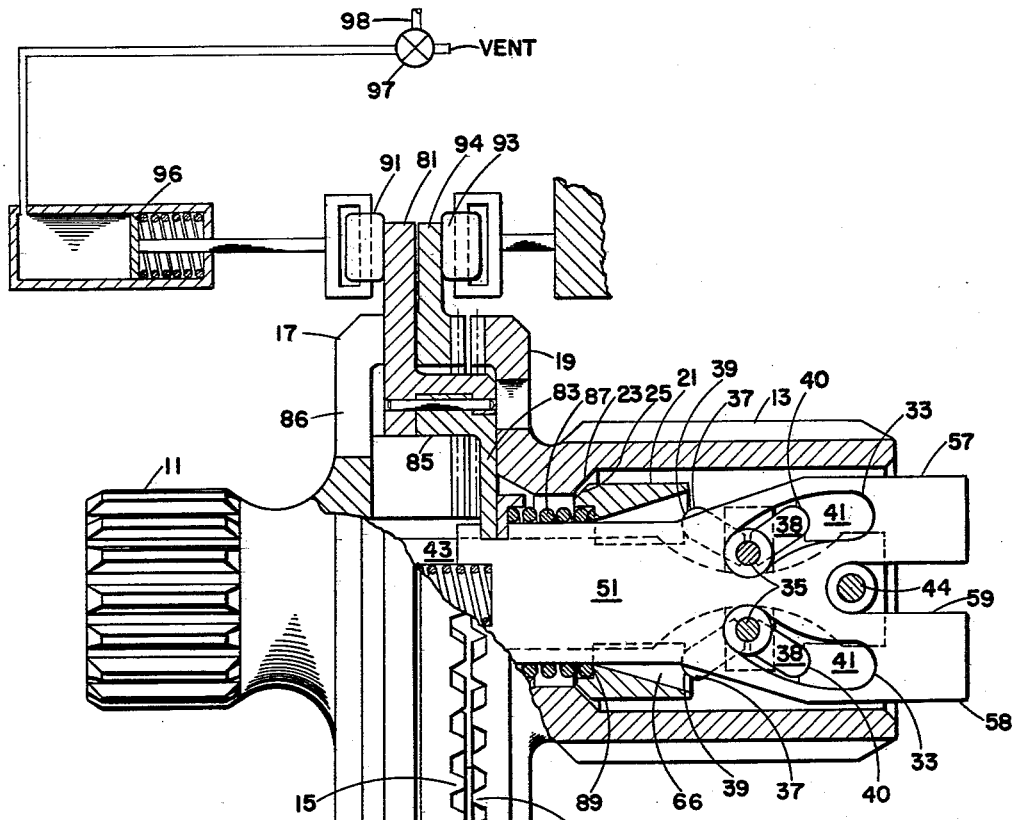
FIG. 4 is a partially-cross-sectioned side view and shows the disengaged position and control means for axially-actuating a ring connected to the cam plate.
Figure 5:
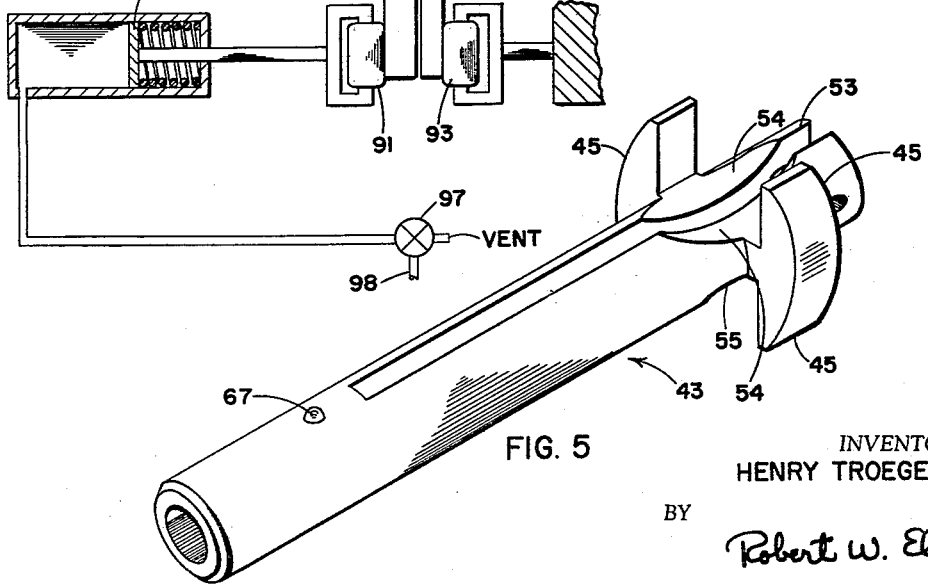
FIG. 5 is a perspective view of the axial-extending support rod and shows the slot in which the cam plate is mounted.

The control means for smoothly engaging and moving the rotating ring 81 to the right for collapsing the toggles and disconnecting is schematically shown in FIG. 4 and includes top and bottom movable rollers 91 for uniformly contacting the left face of rotating actuating ring 81 and opposed fixed-reaction rollers 93 for axially positioning the left shaft 17 by axial contact with the right face of the peripheral annular extension 94 from flange 17 adjacent teeth 15. Such axial positioning also results if shaft 11 is axially restrained by its connection to an accessory. Means for pulling ring 81 and extension 94 together can also be used. Rollers 91 are moved to the right for contact with ring 81 by piston 96 connected thereto when three-way valves 97 are simultaneously adjusted to admit low pressurized air from pipes 98 to the back of the pistons 96. Turning valves 97 to vent position results in the spring-biased pistons 96 and rollers 91 moving to the left out of contact with ring 81. It is to be noted that right face of the connection ring 93 will travel sufficiently when in disconnect position to abut and position the inner face of flange 19 so that curvic teeth 15 do not clash after separation. Shaft 13 will be axially-movable by its spline connection to the engine to provide for the separation. In the disconnected showing in FIG. 4, it can be seen that the wedging ring 21 is spaced to the right and the axial rod 43 accommodates the inwardly-pivoted toggles in recesses 54 and 55.

In operation when the coupling is transmitting torque and then disconnecting is required, actuating ring 81 is uniformly pushed or moved rapidly to the right by opening valves 97 of the control means so that rollers 91 smoothly engage the rotating ring 81. This action axially shifts the cam plate 51 to the right causing the rapid collapse of the toggles about pins 35 and rightward unlocking motion of the spring-biased locking ring 21. This removal of axial restraint allows the curvic teeth 15 having the self-separating pressure angles to disengage rapidly. Actuating ring 81 will move rightward until connection ring 83 is flush against the inner face of the flange 19 and will be clamped against flange 17 until re-engagement is desired. Since the right face of the connection ring 83 will move past the curvic teeth of the input shaft, clashing of the curvic teeth 15 is prevented. When re-engagement is desired after all rotation has stopped and the cause for operating the emergency disconnect device has been corrected, the piston is vented so that the actuating ring is allowed to return to its normal position under the urging of spring 87 which moves the cam plate 51 and toggles to the locked position shown in FIG. 1 when the curvic teeth are mated or re-engaged. It is to be noted that the axial motion necessary to actuate the device is applied smoothly in the manner of a brake so that it can be applied at any speed. Torsional vibration will not result in false disconnects. The compactness of the device, radially and axially, is apparent.

It is to be realized that persons skilled in the art can make changes in the disclosed embodiment without departing from the invention as defined in the following claims.

What is claimed is:

1. An emergency disconnect coupling comprised of a hollow input shaft having an outwardly-extending input flange, curvic teeth extending axially from the edge of said input flange, a hollow output shaft having an outwardly-extending output flange and axially-extending curvic teeth which are mated with said input curvic teeth, an axial rod mounted in said output shaft and extending axially into the interior of said input shaft, said input shaft having a radially-inwardly-extending annular shoulder which has an inclined wedge surface, a locking ring having an inclined surface wedged against said wedge surface, a collar mounted on said axial rod and spaced from said locking ring, toggle links having fulcrum pins and extending axially between said collar and said wedge ring, an axial cam plate having cam slots receiving said fulcrum pins, said axial rod having a radial slot receiving said cam plate, said cam plate normally holding said fulcrum pins so that said links are aligned and being constructed to collapse the toggle links inwardly when said cam plate is moved toward said collar.

2. An emergency disconnect coupling comprised of a hollow input shaft having an outwardly-extending input flange, curvic teeth extending axially from the edge of said input flange, a hollow output shaft having an outwardly-extending output flange and axially-extending curvic teeth which are mated with said input curvic teeth, an axial rod mounted in said output shaft and extending axially into the interior of said input shaft, said input shaft having a radially-inwardly-extending annular shoulder which has an inclined wedge surface, a locking ring having an inclined surface wedged against said wedge surface, a collar mounted on said axial rod and spaced from said locking ring, toggle links having fulcrum pins and extending axially between said collar and said wedge ring, an axial cam plate having cam slots receiving said fulcrum pins and fitting into a radial slot in said axial rod, said cam plate normally holding said fulcrum pins so that said links are aligned and being constructed to collapse the toggle links inwardly when said cam plate is moved toward said collar, actuator means including an actuating ring exteriorly of said output flange and connected through openings in said output flange to a connection ring mounted on said cam plate, spring means extending between said locking ring and said connection ring and biasing said cam plate and said connection ring against said output shaft, said actuator means and said cam plate being axially movable to cause collapse of said toggle links so that said locking ring is moved away from said shoulder whereby said curvic teeth separate when said input shaft is powered, said actuator means when moved to disconnect position having said connection ring contacting said input shaft and positioning said curvic teeth apart, control means arranged for smoothly engaging and axially moving said actuating ring when said actuating ring is rotating, said spring means causing said toggle links and said locking ring to be repositioned when said teeth are re-engaged and said control means is inoperative.

3. An emergency disconnect coupling comprised of a hollow input shaft having an outwardly-extending input flange, curvic teeth extending axially from the edge of said input flange, a hollow output shaft having an outwardly-extending output flange and axially-extending curvic teeth which are mated with said input curvic teeth, an axial rod mounted in said output shaft and extending axially into the interior of said input shaft, said input shaft having a radially-inwardly-extending annular shoulder which has an inclined wedge surface, a locking ring having an inclined surface wedged against said wedge surface, a collar mounted on said axial rod and spaced from said locking ring, toggle links having fulcrum pins and extending axially between said collar and said wedge ring, an axial cam plate having cam slots receiving said fulcrum pins and fitting into a radial slot in said axial rod, said cam plate slots normally holding said fulcrum pins so that said links are aligned and being constructed to collapse the toggle links inwardly when said cam plate is moved toward said collar, actuator means including an actuating ring exteriorly of said output flange and connected through openings in said output flange to a connection ring mounted on said cam plate, spring means extending between said locking ring and said connection ring, said actuator means and said cam plate being axially movable to cause collapse of said toggle links so that said locking ring is released, said actuator means when moved to disconnect position having said connection ring contacting said input shaft and positioning said curvic teeth apart, control means arranged for smoothly engaging and axially moving said actuating ring when said actuating ring is rotating, said cam plate being slidably guided in said collar, said axial rod having side projections arranged to confine the ends of said fulcrum pins and said toggle arms and further having recesses for receiving said toggle links when pivoted inwardly.

4. An emergency disconnect device comprised of a hollow drive shaft and a driven shaft, said shafts having facing surfaces, mating teeth in said facing surfaces, said teeth being engaged and having self-separating axially-extending sides, locking means within said drive shaft including aligned toggle links normally holding said teeth in engaged position, said locking means being carried by said driven shaft, cam means carried by said driven shaft and axially connected to said toggle links for alignment thereof, said cam means being arranged to move axially to collapse said toggle links for separation of said teeth, said cam means having an actuating ring positioned exteriorly of said shafts and control means constructed to smoothly engage said actuating ring when said ring is rotating and to cause axial motion of said cam means.

5. An emergency disconnect device comprised of a hollow drive shaft and a driven shaft, said shafts having facing surfaces, mating curvic teeth in said facing surfaces, said teeth being engaged, an axial rod mounted in said driven shaft and extending axially into the interior of said hollow drive shaft, locking means within said drive shaft and carried by said axial rod, said locking means normally holding said teeth in engagement, said locking means having an axially-movable locking element contacting said drive shaft, said locking means including aligned toggle links holding said locking element in contact with said drive shaft, cam means axially connected to said toggle links and guided by said axial rod, said cam means being arranged to position said toggle links in alignment and to move axially to cause collapse of said toggle links so that said teeth can disengage.

6. An emergency disconnect device comprised of a hollow drive shaft and a driven shaft, said shafts having outwardly-extending flanges, said flanges having facing surfaces, mating curvic teeth in said facing surfaces of said outwardly-extending flanges, said teeth being engaged, an axial rod mounted in said driven shaft and extending axially into the interior of said hollow drive shaft, locking means within said drive shaft and carried by said axial rod, said locking means normally holding said teeth in engagement, said locking means having an axially-movable locking element contacting said drive shaft, said locking means including a reaction collar and aligned toggle links holding said locking element in contact with said drive shaft, cam means extending through the flange of said driven shaft and axially connected to said toggle links, said cam means being arranged to position said toggle links in alignment and to move axially to cause collapse of said toggle links so that said teeth can disengage.

7. An emergency disconnect device comprised of a hollow drive shaft and a driven shaft, said shafts having facing surfaces, mating teeth in said facing surfaces, said teeth being engaged and having self-expanding axially-extending sides, locking means within said drive shaft including aligned toggle links normally holding said teeth in engaged position, said locking means being carried by said driven shaft, cam means carried by said driven shaft and axially connected to said toggle links for alignment thereof, said cam means being arranged to move axially to collapse said toggle links for separation of said teeth, said cam means having structure arranged to abut said drive shaft to space said drive and driven shafts so that said teeth remain out of contact after said cam means is moved axially to collapse said toggle links.

References Cited in the file of this patent

UNITED STATES PATENTS

| 800,728 | Ellis et al. | Oct. 3, 1905 |
| 2,382,869 | Fisher | Aug. 14, 1945 |

FOREIGN PATENTS

| 522,268 | Great Britain | June 13, 1940 |
| 892,405 | Austria | Oct. 3, 1953 |